United States Patent [19]

Gariazzo

[11] 4,003,083
[45] Jan. 11, 1977

[54] DIGITAL DATA RECORDING AND DECODING

[75] Inventor: Michael C. Gariazzo, Bowie, Md.

[73] Assignee: The United States of America as represented by the Secretary of the Navy, Washington, D.C.

[22] Filed: Apr. 15, 1975

[21] Appl. No.: 568,235

[52] U.S. Cl. .................................. 360/29; 360/39; 340/347 DD

[51] Int. Cl.² .......................................... G11B 5/06

[58] Field of Search .................. 360/39, 42, 51, 18, 360/32, 52, 93; 343/200; 178/50; 179/15 R; 340/147 C, 183, 347 NT

[56] References Cited

UNITED STATES PATENTS

| 2,461,368 | 2/1949 | Bradley | 360/29 X |
|---|---|---|---|
| 3,016,516 | 1/1962 | Doersam | 340/147 C |
| 3,544,895 | 1/1968 | Richman | 340/347 X |
| 3,824,585 | 7/1974 | Meijer | 340/347 NT |

OTHER PUBLICATIONS

Analog Devices, Inc., "Analog–Digital Conversion Handbook," 6/72, pp. III–50, 51.

Iwamura et al. "Pulse–Code–Modulation Recording System," 9/73, vol. 21. No. 7, Jrnl of Audio Eng'g soc.

Primary Examiner—Thomas J. Sloyan
Attorney, Agent, or Firm—R. Sciascia; R. Beers; S. Sheinbein

[57] ABSTRACT

An economical system for both recording multiplexed digital data on a tape recorder and decoding the stored data.

6 Claims, 17 Drawing Figures

FIG. 2(a) Q$_8$
FIG. 2(b) Q$_9$
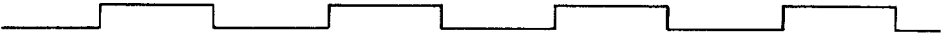
FIG. 2(c) Q$_{10}$
FIG. 2(d) Q$_{11}$
FIG. 2(e) Q$_{12}$
FIG. 2(f) WM
FIG. 2(g) D$_0$
FIG. 2(h) D$_1$
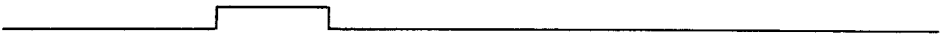
FIG. 2(i) D$_2$
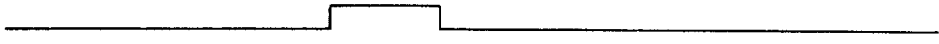
FIG. 2(j) D$_3$
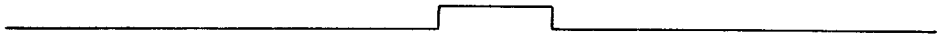
FIG. 2(k) D$_4$
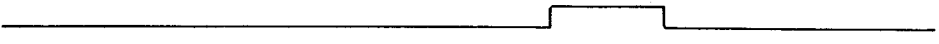
FIG. 2(l) D$_5$
FIG. 2(m) D$_6$
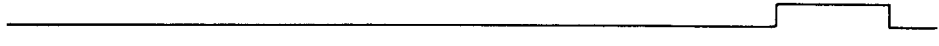
FIG. 2(n) D$_7$
FIG. 2(o) OUT

DIGITAL DATA RECORDING AND DECODING

BACKGROUND OF THE INVENTION

The present invention relates to digital data recording and more particularly to a magnetic digital recording and readout system.

Digital data recording schemes are many and varied. The computer industry, for example, has achieved rather high-speed transfer rates with some tape storage devices. Recorders intended for field use feature high reliability notwithstanding severe environmental conditions. However, such advantages incur high costs, to the extend that many potential applications are rendered cost incompatible.

SUMMARY OF THE INVENTION

Accordingly, there is provided a low cost system for storing and retrieving digital information from a storage device employing standard off-the-shelf integrated circuitry. The digital information, in the form of data words, is introduced into parallel-in, serial-out shift registers and then multiplexed into the storage device by employing an encoder. Means for identifying the several distinct digital words are provided. Decoding employs shift registers, counters and decoders to serial-to-parallel convert and desequence the data. Further, a phase-locked loop is employed to synchronize and compensate for frequency variations.

OBJECT OF THE INVENTION

It is therefore an object of the present invention to provide a low-cost system for the storage of digital data.

Another object of the present invention is to provide a low-cost system for the decoding of digital data.

Yet another object of the present invention is to provide a digital recording system employing standard equipment without the need for additional interface equipment.

Still another object of the present invention is to provide a low cost, automatic data recording scheme.

A still further object of the present invention is to provide a multiplexing digital recording-decoding scheme automatically compensating for frequency variations.

Another object of the present invention is to provide a parallel-in serial-out digital recording system and serial-in, parallel-out decoding system, recording and decoding system multiplexed and synchronized to each other.

Other objects, advantages and novel features of the invention will become apparent from the following detailed description of the invention when considered in conjunction with the accompanying drawings wherein:

FIG. 1 illustrates in block diagram form the apparatus for encoding digital information according to the invention;

FIGS. 2(*a*) - 2(*o*) illustrate the various waveforms of signals at several points in the apparatus of the encoding system; and FIG. 3 illustrates in block diagram form the apparatus for decoding digital information according to the invention.

DESCRIPTION OF THE PREFERRED EMBODIMENT

Figure 1:
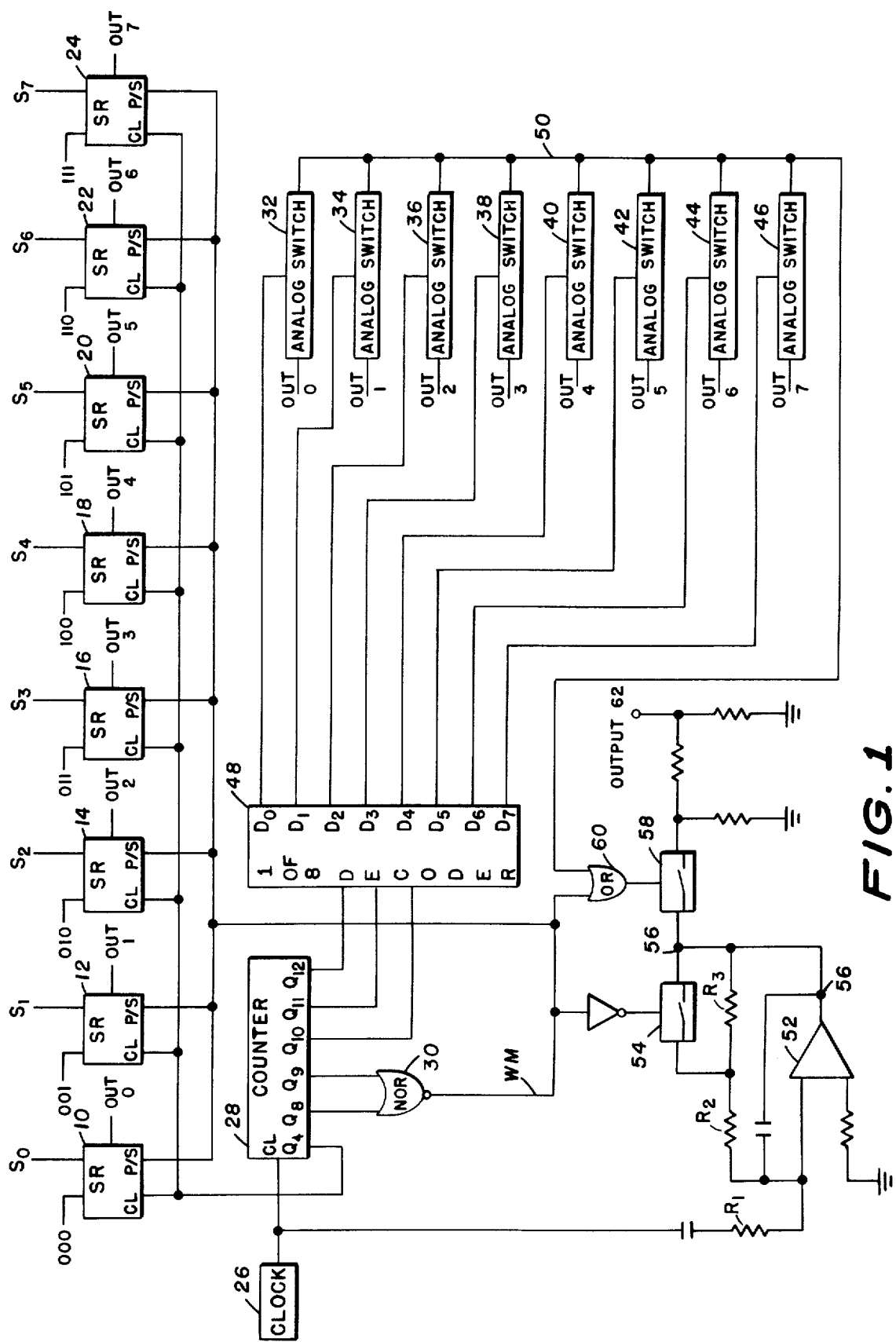

Referring now to the drawings, and more particularly to FIG. 1, there is shown a logic diagram of the encoding circuitry. The signal source representing different parameters, nominally eight 12 bit parallel signals designed as $S_0$, $S_1$, $S_2$, $S_3$, $S_4$, $S_5$, $S_6$, $S_7$ are introduced as the inputs of 16 bit parallel-in serial-out shift registers 10, 12, 14, 16, 18, 20, 22 and 24 along with three bit-codes corresponding to the signal numbers 0-7, respectively. A clock 26, nominally set to 4096 Hz, hereinafter 4 KHz, although any other suitable frequency may be employed, is counted down by conventional counter 28, producing outputs of 256 Hz at output $Q_4$, 16 Hz at output $Q_8$, 8 Hz at output $Q_9$, 4 Hz at output $Q_{10}$, 2 Hz at output $Q_{11}$, and 1 Hz at output $Q_{12}$. FIGS. 2(*a*) through 2(*e*) illustrate the relationship between those signals.

Outputs $Q_8$ and $Q_9$ are supplied to NOR gate 30, whose output Word Mark (WM), FIG. 2(*f*), is fed into the Parallel/Serial (P/S) control of shift registers 10-24; enabling signals $S_0$-$S_7$ to be entered into shift registers 10-24 when WM is a logical 1. When WM returns to a logical 0, serial operation is selected, and the 256 Hz signal, $Q_4$, begins clocking the data out of shift registers 10-24 into analog switches 32, 34, 36, 38, 40, 42, 44 and 46 respectively.

Outputs 10101, $Q_{11}$, and $Q_{12}$ of counter 28 are supplied to conventional 1 of 8 decoder 48 to ensure order by combining to select just one of the eight shift register outputs at a time. Outputs $D_0$-$D_7$ (FIGS. 2(*g*) through FIGS. 2(*n*)) of decoder 48 control analog switches 32 and 46, respectively, to enable only one of the shift register outputs to be provided at output terminal 50 since the decoder outputs are mutually exclusive.

While the aforementioned operations are taking place, the 4 KHz clock 26 signal is amplified in operational amplifier 52. Whenever switch 54, coupled between NOR gate 30 and operational amplifier 52 is open, as it is when WM is a logical 1, the gain of the amplifier is -($R_2$ $R_3/R_1$) and a signal at terminal 56 corresponding to that amplitude is provided. When WM returns to logical 0, switch 54 closed and the gain is reduced -$R_2/R_1$ The 4 KHz carrier at terminal 56 is thereby proportionately attenuated, and and modulates the WM or data signal appearing at the output of OR gate 60 which keys switch 58 on and off. Output 62 of switch 58 is therefore suitably attenuated, supplying an $A_1$WM and $A_2$data signal fed to a tape recorder for recording, and a representative sample of that output is shown in FIG. 2(*o*).

The reason for amplitude modulation of the 4 KHz signal in operational amplifier 52 will now be explained. The clock signal is employed to generate two signals: "word marks", to serve as synchronizing pulses to provide the necessary timing, at an amplitude $A_1$, and data bits at a lesser amplitude $A_2$ (Note FIG. 2(*o*)). The falling edge of the detected word mark is used to initiate the generation of a pulse train wherein the rising edge of each of the pulse occurs precisely in the center of the allocated time span for a bit of data, in one to one correspondence. By introducing the recorder output, when suitably conditioned, to the data input of a serial to parallel shift register, a data word can be loaded therein synchronously with the clock pulses. The first data bit is selected to be valid from 2 milliseconds after the WM ends until 6 milliseconds after. The second data bit is valid from 6–10 milliseconds, the third from 10–14 milliseconds, etc., which is used in the decoding process.

Figure 3:
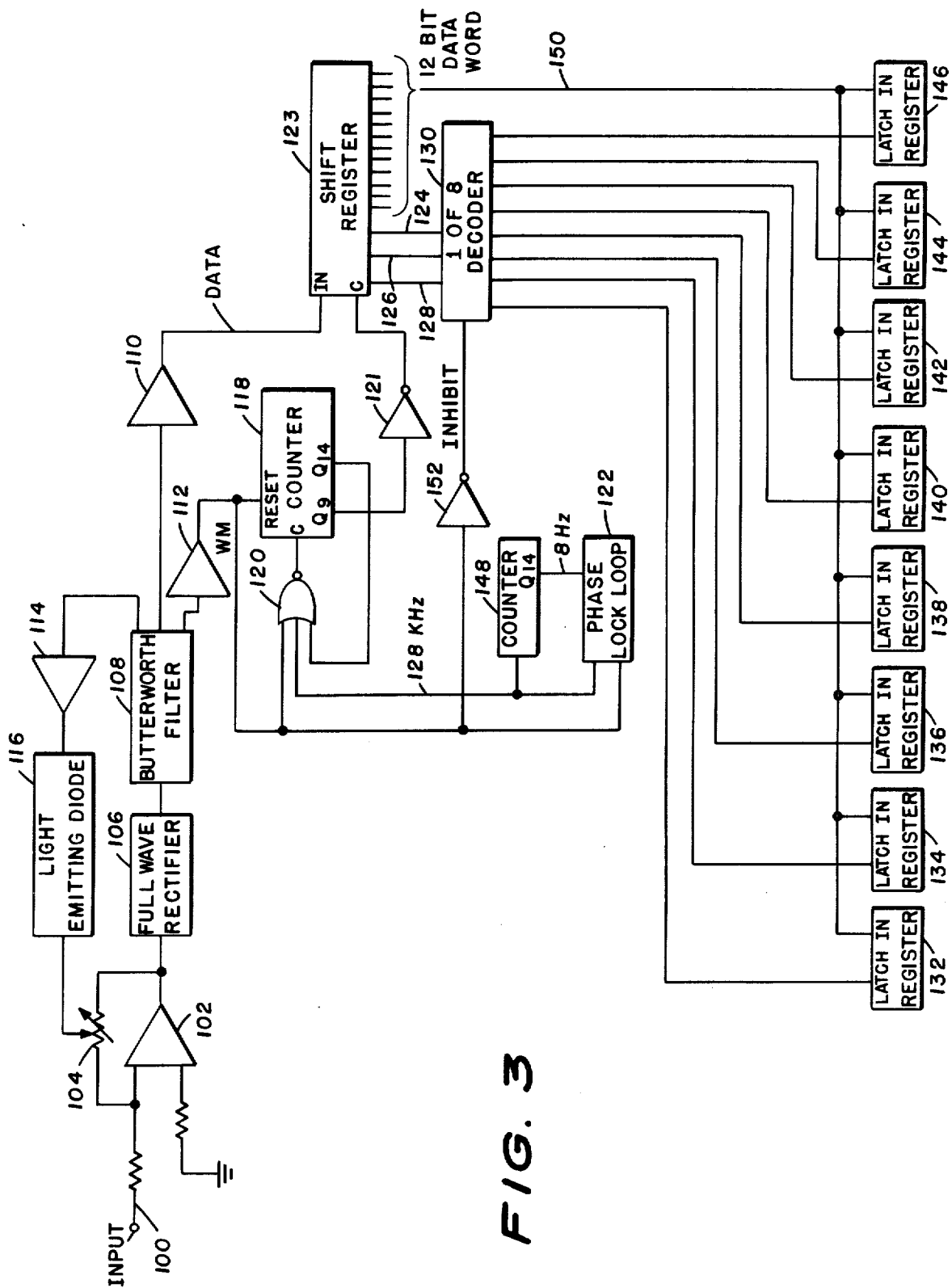

Playback of the data recorded described hereinabove looks as it did when being recorded. Decoding is similar to recording, i.e., amplification and filtering to recover the envelope of the signal, and serial to parallel conversion and desequencing the data. Referring now to FIG. 3, operational amplifier 102 is provided to enable linear gain of the input signal at terminal 100 and is adjustable in variable resistor 104 to compensate for different recorders or magnetic tapes. The output of operational amplifier 102 is provided to full wave rectifier 106, which may comprise a pair of operational amplifiers, whose output is then supplied to operational amplifiers 110, 112, and 114 after filtering in Butterworth filter 108. Operational amplifiers 110, 112 and 114 are threshold detectors wherein the threshold of operational amplifier 110 is set above the level of any noise but below the amplitude $A_2$ (FIG. 2(o)) of the data. Operational amplifier 112 detects amplitudes greater than $A_2$ but less than $A_1$, thereby extracting the word marks from the data. The threshold of operational amplifier 114 is set at amplitude $A_1$, and drives an LED 116 whereby the gain of operational amplifier 102 is adjusted in resistor 104 (manually or automatically) for different recorder-tape configurations until the LED just stops flashing. Outputs DATA and WM of operational amplifiers 110 and 112, respectively, are fed to the decoding section to be described hereinafter.

When WM goes to a logical 1, counter 118 coupled thereto is cleared, and NOR gate 120, also coupled thereto, is inhibited. Upon WM returning to logical 0, gate 120 enables a 128 KHz signal from phase locked loop 122 to clock counter 118. Output $Q_9$ of counter 118 is inverted and its inversion as produced by gate 121 coupled thereto, has its first rising edge approximately 4 milliseconds after WM falling, and another every 4 milliseconds thereafter. This signal is supplied to shift register 123 and continues exactly 16 pulses, at which time input $Q_{14}$ becomes a logical one to inhibit gate 120. It is therefore seen that the pulse chain produced by gate 120 has a rising edge at 4 milliseconds, 8 milliseconds, etc., or precisely at the center of each data bit. By introducing the DATA line from operational amplifier 110 to shift register 122, and clocking it with the signal from gate 121, serial-to parallel conversion of a data word is accomplished.

The last three bits of the data word identify which of the eight parameters is currently in shift register 122. These three bits 124, 126 and 128 from shift register 123 are fed into a conventional 1 of 8 decoder 130 which selects the appropriate register from among registers 132, 134, 136, 138, 140, 142, 144 and 148 coupled thereto to receive the data from shift register 123 coupled thereto by line 150. Selection and latching by decoder 130 is inhibited by a logical zero from gate 152 coupled thereto, until WM becomes a logical one at which time the loading is performed. In this manner, all eight registers 132–146 store the most current updating of their parameter at all times.

In order to compensate for fluctuations in tape speed, frequency variations, or mismatch or imprecision in oscillators employed in the encoding and decoding operations, a conventional phase locked loop 122 oscillating around 128 KHz is coupled to signal WM and NOR gate 120. Counter 148 supplies an 8 Hz signal, counted down from the 128 KHz supplied thereto from phase locked loop 122, as the comparator input of the phase locked loop. The phase locked loop 122 automatically adjusts the 128 KHz oscillator so that the 8 Hz signal from counter 148 and WM are frequency locked. Prediction of the position of each data bit is thereby assured.

There has therefore been described an improved system for recording and decoding digital information. Speedup could be accomplished by adjusting the clocking procedure or decreasing the bit duration, enabling a data rate of up to 1000 bits per second. Since each word is decoded independently, the multiplexing sequence may be arranged in any suitable fashion. For example, one parameter might be recorded at every other word, while another parameter may be sampled very infrequently. Different Nyquist rates could thereby be accomodated at optimum efficiency. The recorder could be activated automatically, transforming the system into a portable, self-contained, long life remote data and event monitor and being superior to the multiple track chart recorder. The aforementioned system provides a low-cost data recording scheme not requiring any additional interface equipment. Any audio tape recorder, including inexpensive portable cassette models, may be used without additional modification exclusive of the off-the-shelf integrated circuits required for encoding or decoding. Typical circuits for the counters could be CD 4020, CD 4028 for the decoder, CD 4014 for the shift registers, and CD 4046 for the phase locked loops.

Obviously, many modifications and variations of the present invention are possible in light of the above teachings. It is therefore to be understood that within the scope of the appended claims the invention may be practiced, otherwise than as specifically described.

What is claimed as new and desired to be secured by Letters Patent of the United States is:

1. A system for multiplexing signals representative of digital data words for recording and thence their decoding, comprising:
   shift register means for converting said data signals from parallel to serial form;
   means for multiplexing and modulating said data signals for recording, said multiplexing means including:
   a counter;
   a one of eight decoder coupled to said counter; and
   a plurality of analog gates coupled to respective shift registers and said one of eight decoders;
   said modulating means including means for modulating said data signals at a first amplitude $A_2$;
   means for providing a unique output signal, said output signal modulated at a second amplitude $A_1$;
   means for detecting and demultiplexing said signals and said unique output signal for conversion into parallel form, said detecting means including a first, second, third and fourth operational amplifier, said first operational amplifier detecting only said unique output signal, said second operational amplifier detecting said signals representative of the data, said third operational amplifier enabling the control of the gain of said fourth operational amplifier whereby the gain of said fourth operational amplifier is adjusted to compensate for amplitude variations in the recording medium.

2. A decoding system as recited in claim 1, wherein said multiplexing means further comprises:

a clock;

said counter counting down said clock;

a NOR gate coupled to two outputs of said counter for providing said unique output signal to gate said data signals into respective shift registers; and a third output of said counter to clock said date from shift registers into respective analog gates.

3. A system as recited in claim 2 further including:

said one of eight decoder coupled to three outputs of said counter for selecting a respective analog gate for multiplexing;

means for attenuating the output of said clock at an amplitude of $A_1$ and $A_2$;

modulating said unique output signal at said $A_1$ attenuated clock signal and said data signals at said $A_2$ attenuated clock signal;

wherein said multiplexed output signal contains both the data signals at amplitude $A_2$ and said unique output signal at amplitude $A_1$, wherein $A_1$ is greater than $A_2$.

4. A decoding and decoding system as recited in claim 3 wherein said modulated unique output signal serves as synchronizing pulses.

5. A decoding and decoding system as recited in claim 4 further including:

a counter and a shift register wherein the output of said second operational amplifier is supplied to said shift register and the output of said first operational amplifier is supplied to said counter, and wherein said counter clocks said shift register.

6. A decoding and decoding system as recited in claim 5 further including a phase lock loop, and a one of eight decoder coupled to said shift register for demultiplexing respective data signals.

* * * * *